US008573569B2

(12) United States Patent
Hasegawa et al.

(10) Patent No.: US 8,573,569 B2
(45) Date of Patent: Nov. 5, 2013

(54) ACTIVE VIBRATION DAMPER AND METHOD OF MANUFACTURING ACTIVE VIBRATION DAMPER

(75) Inventors: Koichi Hasegawa, Kasugai (JP); Atsushi Muramatsu, Komaki (JP); Tetsuyoshi Shibata, Kitanagoya (JP); Hironori Koyama, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 236 days.

(21) Appl. No.: 12/991,498

(22) PCT Filed: Apr. 5, 2010

(86) PCT No.: PCT/JP2010/002466
§ 371 (c)(1),
(2), (4) Date: Nov. 8, 2010

(87) PCT Pub. No.: WO2010/116704
PCT Pub. Date: Oct. 14, 2010

(65) Prior Publication Data
US 2011/0057367 A1 Mar. 10, 2011

(30) Foreign Application Priority Data
Apr. 8, 2009 (JP) .................................. 2009-093697

(51) Int. Cl.
*F16F 5/00* (2006.01)
(52) U.S. Cl.
USPC ................... 267/140.14; 267/140.2; 248/569
(58) Field of Classification Search
USPC .................. 248/560, 562, 566, 569
See application file for complete search history.

(56) References Cited

U.S. PATENT DOCUMENTS

| 5,427,362 | A | * | 6/1995 | Schilling et al. | ......... 267/140.14 |
| 6,059,275 | A | * | 5/2000 | Muramatsu | .............. 267/140.14 |
| 6,276,673 | B1 | * | 8/2001 | Hibi et al. | ................. 267/140.14 |
| 6,305,675 | B1 | * | 10/2001 | Muramatsu | .............. 267/140.14 |
| 6,315,277 | B1 | * | 11/2001 | Nagasawa | ................ 267/140.14 |

(Continued)

FOREIGN PATENT DOCUMENTS

| CN | 1486528 A | 3/2004 |
| CN | 1831367 A | 9/2006 |

(Continued)

OTHER PUBLICATIONS

International Search Report dated Apr. 27, 2010 in corresponding International Application No. PCT/JP2010/002466.

(Continued)

*Primary Examiner* — Thomas Irvin
(74) *Attorney, Agent, or Firm* — Oliff & Berridge, PLC

(57) ABSTRACT

An active vibration damper including: an inner shaft member provided to a movable member; an outer tube member provided to a stator; a pair of leaf springs elastically connecting axially both sides of the inner shaft member and the outer tube member so as to make a linear actuator operatable by itself; an elastic connecting rubber connecting the inner shaft member and the outer tube member; a mass body holding portion provided to the inner shaft member for holding an additional mass body that is disposed further outwardly than the elastic connecting rubber; and a housing having a structure dividable in an axial direction in which respective openings are secured to each other with an annular seal being interposed therebetween at an outer peripheral side of the elastic connecting rubber.

8 Claims, 7 Drawing Sheets

(56) References Cited

U.S. PATENT DOCUMENTS

| | | | |
|---|---|---|---|
| 6,406,010 B1 * | 6/2002 | Yano et al. | 267/140.14 |
| 6,527,262 B2 * | 3/2003 | Hagino et al. | 267/140.14 |
| 6,565,072 B2 * | 5/2003 | Goto et al. | 267/140.14 |
| 6,777,895 B2 | 8/2004 | Shimoda et al. | |
| 6,907,969 B2 * | 6/2005 | Ichikawa et al. | 188/379 |
| 7,188,830 B2 * | 3/2007 | Kato et al. | 267/140.14 |
| 7,537,202 B2 | 5/2009 | Watanabe | |
| 2006/0097587 A1 | 5/2006 | Ichikawa et al. | |
| 2008/0007125 A1 * | 1/2008 | Koyama et al. | 310/27 |
| 2008/0284075 A1 * | 11/2008 | Saito et al. | 267/140.13 |
| 2011/0042873 A1 * | 2/2011 | Yamamoto et al. | 267/140.14 |

FOREIGN PATENT DOCUMENTS

| | | |
|---|---|---|
| CN | 1831368 A | 9/2006 |
| JP | A-2006-57753 | 3/2006 |
| JP | A-2006-308054 | 11/2006 |
| JP | A-2007-78168 | 3/2007 |
| JP | A-2008-2551 | 1/2008 |
| JP | A-2008-208895 | 9/2008 |
| JP | A-2008-256043 | 10/2008 |

OTHER PUBLICATIONS

Jan. 31, 2013 Office Action issued in Chinese Patent Application No. 201080013312.6 w/partial translation.

* cited by examiner

ACTIVE VIBRATION DAMPER AND METHOD OF MANUFACTURING ACTIVE VIBRATION DAMPER

TECHNICAL FIELD

This invention relates to an active vibration damper that includes an actuator generating oscillation force and actively damps vibration in the target member whose vibration is to be damped. The invention also relates to a method of manufacturing an active vibration damper.

BACKGROUND ART

As one means for damping vibration in a target member whose vibration is to be damped, such as a vehicle body, there is known an active vibration damper, in addition to a dynamic damper which is a passive vibration damper. As disclosed in JP-A-2008-2551 (Patent Citation 1) for example, an active vibration damper includes an actuator generating oscillation force and exhibits active or canceling vibration damping effect against vibration in a target member whose vibration is to be damped.

In the active vibration damper, resonance action is utilized for exhibiting desired vibration damping effect with excellent energy efficiency. As a specific example, as disclosed in Patent Citation 1, a stator and a movable member of the actuator are connected by leaf springs and an elastic connecting rubber, thereby providing a vibration-damping vibrating system in which the movable member is the mass. By adding an appropriate mass body to the movable member, natural frequency of the vibrating system will be adjusted. In this way, the active vibration damper is tuned so as to efficiently exhibit active vibration damping effect over a desired vibration frequency range utilizing resonance action of the vibration-damping vibrating system.

However, in the active vibration damper of conventional construction, it is necessary to specify in advance vibration frequency to be damped for tuning the resonance frequency of the vibration-damping vibrating system. Therefore, there may be a problem that change in vibration frequency to be damped requires significant design changes which will be difficult to deal with. In particular, since the additional mass body is disposed between opposed faces of the actuator and the elastic connecting rubber, in association with change of the additional mass body in size, relative positions of the leaf springs and the elastic connecting rubber would also be changed, thereby varying spring characteristics of the vibration-damping vibrating system. Moreover, since the leaf springs and the elastic connecting rubber are connected via the additional mass body, it is necessary to form an anchor portion to the additional mass body for anchoring the leaf springs and the elastic connecting rubber, inevitably resulting in complicated construction and cumbersome assembly procedure of the device. Additionally, there was a problem that dimensional error of the additional mass body may pose a risk of exerting initial stress on the leaf springs and the elastic connecting rubber, making it difficult to achieve stable spring characteristics.

Furthermore, the additional mass body is disposed between opposed faces of the actuator and the elastic connecting rubber, namely, at the generally center section of the vibration damper. Consequently, in order to avoid malfunction due to interference of the additional mass body with the actuator and the elastic connecting rubber, the overall size of the vibration damper is likely to increase.

Also, in the active vibration damper, with the object of stabilizing operation of the actuator for example, a housing would be employed for covering the entire vibration damper. In a conventional structure, the housing is divided in the axial direction at each outer peripheral portion of the additional mass body and the elastic connecting rubber, and the divided parts are assembled together. This is for the purpose of assembling the additional mass body or the elastic connecting rubber, and of providing a stopper mechanism for limiting an amount of displacement of the additional mass body. However, because the housing is divided at portions where the additional mass body and the elastic connecting rubber are to be disposed respectively, which are axially close to each other, the housing may suffer from the problem of complicated construction as well as difficulty in ensuring sealing performance.

PRIOR ART DOCUMENT

Patent Citation

Patent Citation 1: JP-A-2008-2551

SUMMARY OF THE INVENTION

Problem the Invention Attempts to Solve

With the foregoing in view, it is accordingly an object of the present invention to provide an active vibration damper of novel construction designed to be easily capable of dealing with requirement including changes of the additional mass bodies, without the need for significant design changes, and to provide a manufacturing method thereof.

It is another object of the present invention to provide an active vibration damper capable of inhibiting spring characteristics from varying due to changes of the additional mass bodies or dimensional errors etc. so as to exhibit intended vibration damping effect with high accuracy, and to provide a manufacturing method thereof.

It is a further object of the present invention to provide an active vibration damper capable of stabilizing sealing function of the housing, and to provide a manufacturing method thereof.

Means for Solving the Problem

The above objects of this invention may be attained according to the following modes of the invention, wherein elements described hereinbelow may be adopted in any possible optional combination.

Specifically, the present invention provides an active vibration damper including an electromagnetic linear actuator incorporating a stator and a movable member exerting oscillation force on each other, the stator adapted to be attached to a target member whose vibration is to be damped while the movable member adapted to be elastically supported by the target member via an elastic connecting rubber, the active vibration damper being characterized in that: an inner shaft member is provided to the movable member so as to project to both sides in a direction in which the oscillation force exerts; an outer tube member is provided to the stator so as to be spaced apart peripherally outward from the inner shaft member and extend to both sides in an axial direction; projecting portions situated on axially both sides of the inner shaft member and the outer tube member are elastically connected by a pair of leaf springs so as to make the linear actuator operatable by itself; the elastic connecting rubber is disposed outwardly from one axial side of the linear actuator and connects the inner shaft member and the outer tube member; the inner shaft member is provided with a mass body holding portion capable of holding at least one additional mass body that is disposed further outwardly than the elastic connecting rubber from the one axial side of the linear actuator; a housing is fixed to the stator of the linear actuator and separates a relative displacement zone of the stator and the movable member from an external space while accommodating the pair of the leaf springs and the elastic connecting rubber; and the housing has a structure dividable in the axial direction in which respective openings are secured to each other with an annular seal being interposed therebetween at an outer peripheral side of the elastic connecting rubber.

The active vibration damper according to the present invention is able to easily realize modification of the resonance frequency of the vibration-damping vibrating system in response to a change in frequency of vibration in the target member by means of change of the additional mass bodies or the like, without needing significant design changes. Specifically, the inner shaft member is furnished with the mass body holding portion, which is for holding the additional mass body, disposed on the opposite side of the linear actuator with the elastic connecting rubber being interposed therebetween. This arrangement makes it easy to deal with requirement of change of the additional mass bodies etc. Moreover, it is possible to avoid change in relative position of the elastic connecting rubber and the first, second leaf springs in association with change of the additional mass body in size. Accordingly, variation in spring characteristics of the vibration-damping vibrating system will also be avoided.

Besides, the additional mass body is disposed further outwardly than the elastic connecting rubber from the one axial side of the linear actuator. With this arrangement, the elastic connecting rubber and the first, second leaf springs are connected to each other by the inner shaft member without interposing the additional mass body. Thus, complicated construction of the additional mass body can be avoided, attaining easy fabrication or assembly procedure.

Furthermore, the additional mass body of the inner shaft member is attached to the opposite side of the first, second leaf springs with the elastic connecting rubber being interposed therebetween. With this arrangement, dimensional errors of the additional mass body will be allowable owing to a space provided to the opposite side of the elastic connecting rubber side. Therefore, change of initial stress exerted on the elastic connecting rubber and the first, second leaf springs due to dimensional errors of the additional mass body will be prevented. As a result, it is possible to maintain stable spring characteristics, thereby stably achieving desired vibration damping effect.

Also, the additional mass body is disposed further outwardly than the elastic connecting rubber from the one axial side of the linear actuator. With this arrangement, the additional mass body will be prevented from directly striking against the linear actuator. Therefore, distance separating the linear actuator from the elastic connecting rubber and the additional mass body can be set small, whereby a compact active vibration damper will be practical.

Additionally, since it is not necessary to provide a stopper mechanism for preventing interference of the additional mass body with the linear actuator, a simple structure will be realized. Moreover, unlike the vibration damper of conventional construction, the housing need not have a structure dividable at respective portions situated at the outer peripheral side of the additional mass body and at the outer peripheral side of the elastic connecting rubber. Thus, the housing is able to achieve simple construction as well as improved sealing performance.

Meanwhile, the active vibration damper according to the present invention preferably employs the following mode, for example, wherein: the housing having the structure dividable in the axial direction is such that the respective openings at a dividable portion are detained by caulking against each other; an acting member is provided by being supported by a caulked portion of the respective openings so as to extend into the housing and exert acting force from other components on the housing; an acting rubber is affixed to an input portion of the acting force in the acting member; and the annular seal is integrally formed with the acting rubber and affixed to the acting member.

According to this mode, the annular seal is integrally formed with the acting rubber that is affixed to the acting member in order to receive acting force. With this arrangement, sealing at the attachment section of the dividable housing (respective openings of the housing division units) can be realized without needing special component for sealing such as an O-shaped ring, thereby reducing the number of parts and simplifying the construction. In particular, since the annular seal is affixed to the acting member together with the acting rubber, a mistake of forgetting attachment of the annular seal will be prevented and the annular seal will be attached to the accurate position in an appropriate state utilizing the acting member. Thus, it is possible to stably and readily attain desired sealing performance with high reliability.

The acting rubber may comprise the elastic connecting rubber, in which case the annular seal is integrally formed with the elastic connecting rubber. With this arrangement, in the linear actuator, a force caused by displacement of the inner shaft member relative to the outer tube member in the axial direction will act as the acting force and exert from the elastic connecting rubber on the acting member, then exert on the housing via the acting member. Specifically, the acting member serves as an outside peripheral fastener fitting that is affixed to the outside peripheral portion of the elastic connecting rubber and securely supports the outside peripheral portion of the elastic connecting rubber with respect to the outer tube member.

Alternatively, the acting rubber may comprise a cushion rubber that is a constituent of a stopper mechanism for limiting an amount of displacement of the additional mass body. In such case, in a preferred mode, the additional mass body includes a recess formed on an outside peripheral face thereof, a distal end on an inner peripheral side of the acting member is inserted into the recess while a cushion rubber serving as the acting rubber is affixed to the distal end on the inner peripheral side of the acting member so that a stopper mechanism is formed for exerting the acting force by the acting member coming into abutment against an inside face of the recess on the housing via the cushion rubber and for limiting in cushioned fashion an amount of displacement of the additional mass body with respect to the outer tube member in the axial direction of the inner shaft member.

According to this mode, the annular seal is integrally formed with the cushion rubber. Also, a force of contact in the stopper mechanism that limits the amount of displacement of the additional mass body in the axial direction will act as the acting force and exert from the cushion rubber on the acting member, then exert on the housing via the acting member. Specifically, the acting member serves as a stopper fitting that is securely supported with respect to the housing and receives impact load during limiting the amount of displacement of the additional mass body with respect to the housing.

When employing the above-described acting member in the present invention, one preferred mode employs a construction in which the caulked portion of the acting member against the housing is detained by caulking in metal-to-metal contact. More specifically, in the preferred mode, an outer peripheral edge of the acting member supported by the caulked portion of the housing is provided with a recessed groove extending in an axis-perpendicular direction, and a connecting rubber extending within the recessed groove connects the acting rubber and the annular seal partially along a circumference so that the acting member is detained by caulking in metal-to-metal contact at a circumferential location situated away from a formation zone of the recessed groove.

According to this mode, owing to the connecting rubber that extends within the slot-like recessed groove, the acting rubber and the annular seal are integrally formed with each other. And at the same time, at the circumferential location situated away from the formation zone of the recessed groove, the acting member can be detained by caulking against the housing without interposing a rubber, namely, in a direct metal-to-metal contact by exerting fastening force by caulking from both sides in the plate thickness direction with firmness and excellent durability.

In another preferred mode of the active vibration damper according to the present invention, the at least one additional mass body comprises multiple types of additional mass bodies differing in mass from one another, that are assorted for the one linear actuator, and that are respectively attachable to the mass body holding portion.

By assorting multiple types of additional mass bodies differing in mass from one another in this way, the additional mass bodies can be selectively attached to the mass body holding portion of the inner shaft member. Accordingly, it is possible to efficiently and rapidly deal with required resonance frequency etc. so as to realize desired vibration damping characteristics.

In yet another preferred practice of the active vibration damper according to the present invention, a volume of an air filled within the relative displacement zone of the stator and the movable member formed by the housing is equal at either side across the movable member in the direction in which the oscillation force exerts.

With this arrangement, during oscillating displacement of the movable member with respect to the stator, a ratio of change in volume ($\Delta V/V$) of the air at one side across the movable member in the direction of oscillation is equal to that of the air at the other side. As a result, owing to an air spring filled therein, the magnitudes of forces exerted on the movable member are equal to each other so that the position of the movable member relative to the stator in the direction of oscillation is held in an intended position. Consequently, oscillation force exerted on the movable member will be efficiently attained. In addition, it is possible to minimize or eliminate adverse influence by the air and stably achieve oscillation force of desired magnitude at the desired moment. Thus, canceling vibration damping action will be effectively exhibited on the basis of the oscillation force exerted from the active vibration damper on the target member whose vibration is to be damped.

Meanwhile, one aspect of the present invention relating to a method of manufacturing an active vibration damper provides a method of manufacturing an active vibration damper, comprising the following steps of: preparing one linear actuator according to a following (structure i), in combination with an elastic connecting rubber according to a following (structure ii), multiple types of additional mass bodies according to a following (structure iii), and a housing according to a following (structure iv); attaching the elastic connecting rubber according to the (structure ii) to the linear actuator according to the (structure i); deciding whether or not to attach at least one of the multiple types of the additional mass bodies according to the (structure iii) to the linear actuator according to the (structure i); in case of attaching the at least one of the additional mass bodies, deciding which one or more of the additional mass bodies to be attached and attaching the at least one of the additional mass bodies to the linear actuator in accordance with the decision; and then forming the housing according to the (structure iv):

(Structure i)

a linear actuator operatable by itself comprising: a stator and a movable member exerting oscillation force on each other; an inner shaft member provided to the movable member so as to project to both sides in a direction in which the oscillation force exerts; an outer tube member provided to the stator so as to be spaced apart peripherally outward from the inner shaft member and extend to both sides in an axial direction; and a pair of leaf springs elastically connecting projecting portions situated on axially both sides of the inner shaft member and the outer tube member;

(Structure ii)

an elastic connecting rubber disposed outwardly from one axial side of the linear actuator according to the (structure i) and connecting the inner shaft member and the outer tube member;

(Structure iii)

multiple types of additional mass bodies differing in mass from one another adapted to be disposed further outwardly than the elastic connecting rubber according to the (structure ii) from the one axial side of the linear actuator according to the (structure i), and selectively attachable to a mass body holding portion provided to the inner shaft member of the linear actuator according to the (structure i); and (Structure iv)

a housing having a structure dividable in the axial direction in which respective openings are secured to each other with an annular seal being interposed therebetween at an outer peripheral side of the elastic connecting rubber according to the (structure ii), and being fixed to the stator of the linear actuator according to the (structure i) so as to separate a relative displacement zone of the stator and the movable member from an external space while accommodating the pair of the leaf springs and the elastic connecting rubber according to the (structure ii).

According to the above-described method of the present invention, it is possible to desirably decide whether or not to attach at least one of the additional mass bodies, and which one or more of the additional mass bodies to be attached, without changing the linear actuator described in the (structure i). Therefore, the respective components including the linear actuator may have uniform configurations while multiple types of active vibration dampers differing in vibration damping characteristics may be manufactured, making it possible to rapidly and readily deal with change of the required vibration damping characteristics. Moreover, by forming the housing after selecting the additional mass body, the size and shape of the housing can be decided depending on the selected additional mass body. Thus, the accommodation area of the additional mass body within the housing will require less space so as to achieve an active vibration damper of compact size.

In another preferred mode of the method of manufacturing an active vibration damper according to the present invention, prior to attachment of the elastic connecting rubber according to the (structure ii), operation characteristics may be inspected with respect to the linear actuator according to the (structure i) by itself.

Since the linear actuator according to the (structure i) has a construction that is operatable by itself, operation characteristics of the linear actuator by itself can be checked prior to attachment of the (structure ii)-the (structure iv). This makes it possible to discover operation failure of the linear actuator by itself due to disconnection or the like so as to obviate occurrence of defective products or variability in product ability.

EMBODIMENTS FOR CARRYING OUT THE INVENTION

A fuller understanding of the present invention is provided by the following detailed description of the embodiments with reference to the accompanying drawings.

Figure 1:
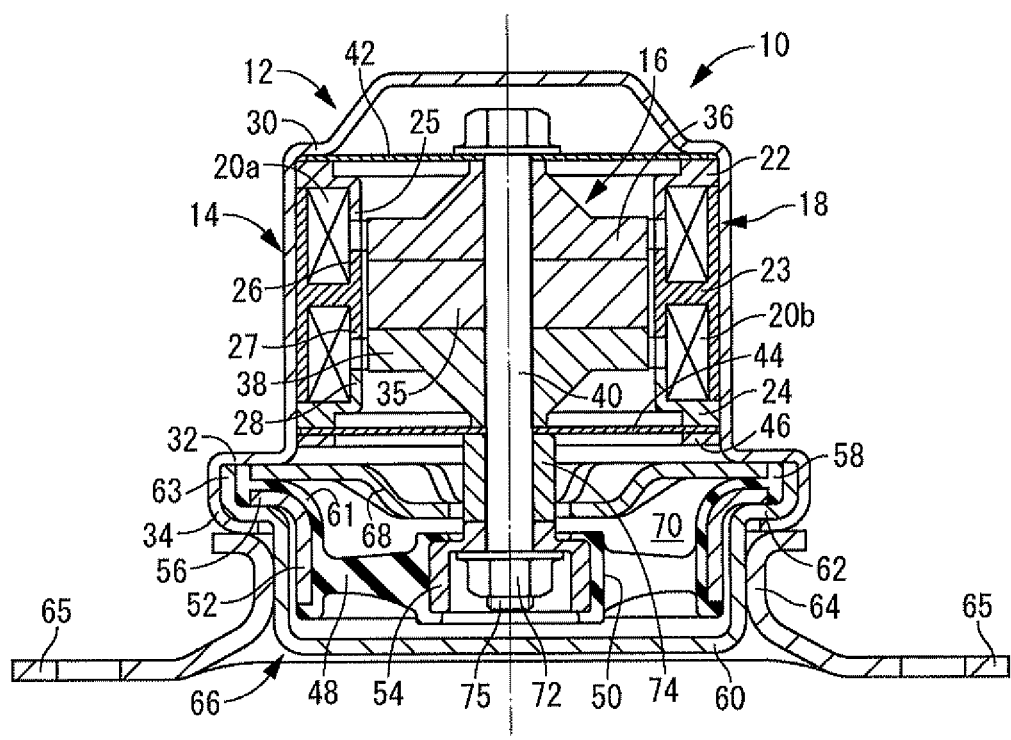
FIG. 1 is a longitudinal cross sectional view of an active vibration damper according to a first embodiment of the present invention, with no additional mass member attached.

First, FIG. 1 shows an active vibration damper 10 of construction according to a first embodiment of the invention. The active vibration damper 10 includes an electromagnetic linear actuator 12. In the following description, a vertical direction shall mean the vertical direction in FIG. 1.

Described more specifically, the linear actuator 12 has a stator 14 and a movable member 16. The stator 14 includes a coil member 18 serving as an outer tube member. The coil member 18 has a generally round tubular shape extending in the axial direction, and is furnished with: a pair of coils 20a, 20b wound around with a tubular shape; and an upper yoke fitting 22, a center yoke fitting 23, and a lower yoke fitting 24 that are attached to the coil 20a, 20b and form a magnetic path.

The upper yoke fitting 22 is of generally annular shape and has an annular first upper magnetic pole portion 25 which is integrally formed with inner peripheral edge of the upper yoke fitting 22 and projects downward. The center yoke fitting 23 is integrally equipped with: a dividing wall of generally ring plate shape; an outside peripheral wall protruding axially on either side of the outer peripheral edge of the dividing wall; and an inside peripheral wall protruding axially on either side of the inner peripheral edge of the dividing wall. With regard to the inside peripheral wall of the center yoke fitting 23, the protruding portion above the dividing wall defines a first lower magnetic pole portion 26 while the protruding portion below the dividing wall defines a second upper magnetic pole portion 27. The lower yoke fitting 24 is of generally annular shape and has a second lower magnetic pole portion 28 which is integrally formed with the inner peripheral edge of the lower yoke fitting 24 and projects upward.

The upper yoke fitting 22 and the lower yoke fitting 24 are superposed against the center yoke fitting 23 from axially either side. The coil 20a is housed between the upper yoke fitting 22 and the center yoke fitting 23, while the coil 20b is housed between the center yoke fitting 23 and the lower yoke fitting 24 in the axial direction. The coil member 18 is formed in this way.

The coil member 18 is attached to an upper cover 30 serving as a housing division unit. The upper cover 30 has a thin-walled, large-diameter, generally inverted round tubular shape with a bottom overall. The upper cover 30 includes an annular stepped portion 32 at the lower end opening thereof, and a caulking piece 34 integrally formed with the outer peripheral edge of the stepped portion 32 and extending downward. The yoke fittings 22-24 are secured press-fit into the upper cover 30.

Meanwhile, the movable member 16 has a structure in which a first magnetic pole forming member 36 and a second magnetic pole forming member 38 are superposed against axially either side of a magnet 35. The magnet 35 is of generally annular shape while including an N pole formed on its axially upper end portion and an S pole formed on its axially lower end portion. The first magnetic pole forming member 36 and the second magnetic pole forming member 38 both have a generally annular shape corresponding to that of the magnet 35 and are formed of a ferromagnetic material such as iron. By being superposed against the magnet 35, the first and second magnetic pole forming members 36, 38 are respectively magnetized whereby the N pole is formed at the outer peripheral edge of the first magnetic pole forming member 36 while the S pole is formed at the outer peripheral edge of the second magnetic pole forming member 38. The center section of each of the first and second magnetic pole forming members 36, 38 protrudes outward in the axial direction so that the first and second magnetic pole forming members 36, 38 efficiently ensure the mass as a mass member.

The magnet 35, the first magnetic pole forming member 36, and the second magnetic pole forming member 38 are inserted into the inner peripheral side of the coil member 18 and disposed so as to be spaced apart therefrom with a prescribed gap. The magnetic pole generating portion (outer peripheral edge) of each of the first and second magnetic pole forming members 36, 38 are diametrically opposed to the respective upper and lower magnetic pole portions 25-28 of the yoke fittings 22-24 with a prescribed gap therebetween.

An output shaft 40 that constitutes an inner shaft member is inserted into the central holes of the magnet 35 and first, second magnetic pole forming members 36, 38. The output shaft 40 is of generally rod shape and has a head of a bolt integrally formed with one end thereof and a screw thread formed to the other end thereof. The output shaft 40 is inserted so as to project to axially both sides of the first and second magnetic pole forming members 36, 38. As will be described later, the magnet 35 and first, second magnetic pole forming members 36, 38 are connected with one another by the output shaft 40 so as to form the movable member 16.

A first leaf spring 42 is disposed above the upper yoke fitting 22 and the first magnetic pole forming member 36. The first leaf spring 42 has a generally circular disk shape and, while not shown explicitly in the drawings, includes a through hole that pierces the first leaf spring 42 in the thickness direction so as to connect the opposite sides thereof with each other. The outer peripheral edge of the first leaf spring 42 is clasped between the upper yoke fitting 22 and the upper cover 30 while the center portion thereof is secured to the first magnetic pole forming member 36 by the output shaft 40. With this arrangement, the upper yoke fitting 22 and the first magnetic pole forming member 36 are elastically connected with each other by the first leaf spring 42.

A second leaf spring 44 is disposed below the lower yoke fitting 24 and the second magnetic pole forming member 38. The second leaf spring 44 has a shape approximately identical with that of the first leaf spring 42. The outer peripheral edge of the second leaf spring 44 is clasped between the lower yoke fitting 24 and a fastening ring 46 that is fitted into the upper cover 30 while the center portion thereof is secured to the second magnetic pole forming member 38 by the output shaft 40. With this arrangement, the lower yoke fitting 24 and the second magnetic pole forming member 38 are elastically connected with each other by the second leaf spring 44.

In this way, in the linear actuator 12, the movable member 16 and the stator 14 are elastically connected with each other by the first and second leaf springs 42, 44 at both the upper and lower sides, and are relatively positioned in the axial and axis-perpendicular direction. The stator 14 is fixed to the upper cover 30 while the movable member 16 is elastically supported with respect to the upper cover 30 via the first and second leaf springs 42, 44. As a result, the linear actuator 12 is operable by itself without needing attachment of an elastic connecting rubber 48 and a lower cover 60, described later.

The elastic connecting rubber 48 is disposed below the linear actuator 12. The elastic connecting rubber 48 is formed of a rubber elastic body of generally round disk plate shape and has a plurality of communication holes 50 that pierce its diametrical medial portion in the thickness direction so as to connect the opposite sides thereof with each other. An outside peripheral fastener fitting 52 of large-diameter tubular shape is bonded by vulcanization to the outer peripheral edge of the elastic connecting rubber 48 while an inside peripheral fastener fitting 54 of small-diameter tubular shape is bonded by vulcanization to the inner peripheral edge thereof. That is, the elastic connecting rubber 48 takes the form of an integrally vulcanization molded component incorporating the outside peripheral fastener fitting 52 and the inside peripheral fastener fitting 54. A cushion rubber is integrally formed with the inner peripheral edge of the elastic connecting rubber 48 so as to be affixed to the upper and lower end faces of the inside peripheral fastener fitting 54. The cushion rubber will come into contact against a lower cover 60 and a stopper fitting 68 (described later) so as to limit axial displacement of the inside peripheral fastener fitting 54 and hence the movable member 16 in cushioned fashion.

A flange portion 56 is integrally fanned with the upper end of the outside peripheral fastener fitting 52 and flares peripherally outward. On the outer circumferential surface of the flange portion 56 there is provided a sealing rubber 58 serving as an annular seal with substantially unchanging cross section about the entire circumference. The sealing rubber 58 has a round tubular shape that covers the outer circumferential surface of the flange portion 56 throughout its entirety and projects a prescribed height axially upward. A thin connecting rubber 61 that extends from the inside peripheral face of the sealing rubber 58 is formed so as to cover the upper face of the flange portion 56. The connecting rubber 61 extends so as to reach the inside peripheral face of the outside peripheral fastener fitting 52 and is connected to the elastic connecting rubber 48. Specifically, the sealing rubber 58 is integrally formed with the elastic connecting rubber 48 via connection by the connecting rubber 61, thereby taking the form of integrally vulcanization molded component bonded to the outside peripheral fastener fitting 52.

The outside peripheral fastener fitting 52 is attached to a lower cover 60. The lower cover 60 is of generally round tubular shape with a bottom and has a stepped portion 62 provided in proximity to its opening. The diameter of the lower cover 60 is made larger on the upper side of the stepped portion 62 rather than on the lower side, thereby forming an annular collar 63 at the opening of the lower cover 60. The flange portion 56 of the outside peripheral fastener fitting 52 is superposed against the stepped portion 62 of the lower cover 60, whereby the outside peripheral fastener fitting 52 is supported by the lower cover 60. A tubular bracket 64 is mounted onto the lower cover 60. A flange-shaped mounting piece 65 provided to the lower end of the bracket 64 will be secured to a target member whose vibration is to be damped, such as a suspension member, whereby the stator 14 is mounted onto the target member.

Furthermore, the caulking piece 34 of the upper cover 30 is fitted externally onto the collar 63 of the lower cover 60 and then attached fitting around the collar 63 as well as the stepped portion 62 through a caulking process. With this arrangement, the upper cover 30 and the lower cover 60 are detained by caulking with their openings butted at each other. This forms a housing 66 that accommodates the first, second leaf springs 42, 44 and the elastic connecting rubber 48. In other words, the housing 66 has a dividable structure in which the upper cover 30 and the lower cover 60 are assembled together in the axial direction. Between the stepped portion 32 of the upper cover 30 and the stepped portion 62 of the lower cover 60 there is disposed a stopper fitting 68 of round disk plate shape.

In this respect, the sealing rubber 58 is interposed between axially opposed faces of the stepped portion 32 of the upper cover 30 and the stepped portion 62 of the lower cover 60 so as to be in contact against the inside peripheral face of the collar 63. The sealing rubber 58 is subjected to compression force because, for example, the axial free length of the sealing rubber 58 is made slightly larger than the axial length of the collar 63. Accordingly, on the outside peripheral faces of the flange portion 56 of the outside peripheral fastener fitting 52 and the stopper fitting 68, the linking portion of the upper cover 30 and the lower cover 60 is sealed by the sealing rubber 58. With this arrangement, the space separated from the external space by the housing 66 defines a hermetic accommodation area 70. The first, second leaf springs 42, 44 and the elastic connecting rubber 48 are housed within the hermetic accommodation area 70 while the relative displacement zone of the stator and the movable member is constituted by the hermetic accommodation area 70.

As will be apparent from the above description, the present embodiment employs the outside peripheral fastener fitting 52 that serves as an acting member so as to receive the acting force in the axial direction such as the oscillation force from the linear actuator 12 via the elastic connecting rubber 48 and exert the force on the housing 66. On the outside peripheral fastener fitting 52, there is formed the elastic connecting rubber 48 that serves as an acting rubber so as to cover the input portion of the acting force while there is formed the sealing rubber 58 so as to cover the outside peripheral face. These elastic connecting rubber 48 and sealing rubber 58 are connected to be integrally formed by the connecting rubber 61.

On the other hand, with regard to the inside peripheral fastener fitting 54, the output shaft 40 is inserted therethrough and fastened thereto by a nut 72 screwed onto the output shaft 40. With this arrangement, the center section of the elastic connecting rubber 48 is attached to the lower end portion of the output shaft 40, so that the portion of the output shaft 40 projecting below the linear actuator 12 is elastically connected with the lower cover 60 by the elastic connecting rubber 48. Further, the movable member 16 including the output shaft 40 is elastically supported by the target member whose vibration is to be damped via the elastic connecting rubber 48 and the housing 66 while being connected with the stator 14. Between the second leaf spring 44 and the inside peripheral fastener fitting 54 is interposed a spacer member 74 of circular cylinder shape that is attached to the output shaft 40.

The active vibration damper 10 constructed as above is mounted onto the target member whose vibration is to be damped via the bracket 64. The magnetic field generated upon energizing the coil 20a produces an S pole on the first upper magnetic pole portion 25 and an N pole on the first lower magnetic pole portion 26. On the other hand, the magnetic field generated upon energizing the coil 20b produces an N pole on the second upper magnetic pole portion 27 and an S pole on the second lower magnetic pole portion 28. With these arrangements, magnetic attracting force is exerted respectively between the first magnetic pole forming member 36 and the first upper magnetic pole portion 25, and between the second magnetic pole forming member 38 and the second upper magnetic pole portion 27. Meanwhile, magnetic repellent force is exerted respectively between the first magnetic pole forming member 36 and the first lower magnetic pole portion 26, and between the second magnetic pole forming member 38 and the second lower magnetic pole portion 28.

As a result, the movable member 16 incorporating the first and second magnetic pole forming members 36, 38 is forced to move upwardly in the axial direction with respect to the stator 14 incorporating the coils 20a, 20b and the magnetic pole portions 25-28. Moreover, the current flowing through the coils 20a, 20b is Direct Current being executed an ON/OFF control at a certain period. Accordingly, the movable member 16 is adapted to undergo reciprocating displacement in the axial direction with respect to the stator 14 due to magnetic actuating force and elastic force of the first, second leaf springs 42, 44. The oscillation force through the reciprocating displacement of the movable member 16 is exerted on the target member whose vibration is to be damped, whereby the vibration in the target member will be damped in an active or canceling fashion. It may alternatively be acceptable for example that the current flowing through the coils 20a, 20b is Alternating Current controlled according to a frequency of vibration which can be a problem. In this case, the direction to which the movable member 16 is forced to move with respect to the stator 14 is changed so that the movable member 16 undergoes reciprocating displacement in the axial direction. Also, the active vibration damper 10 according to FIG. 1 defines a dynamic shock absorber in which the output shaft 40 and the first, second magnetic pole forming members 36, 38 serve as mass members that are elastically displaceable with respect to the component to be damped.

Here, in the active vibration damper 10, the output shaft 40 is inserted so as to penetrate through the inside peripheral fastener fitting 54. Accordingly, the lower end portion of the output shaft 40 defines a mass body holding portion 75 which juts out to the opposite side of the linear actuator 12 with the inside peripheral fastener fitting 54 (the elastic connecting rubber 48) being interposed therebetween. By modifying the axial dimension (length) of the output shaft 40 or the axial dimension (depth) of the lower cover 60, it is possible to dispose an additional mass member 76 serving as an additional mass body within the hermetic accommodation area 70 and secure it to the movable member 16.

Figure 2:
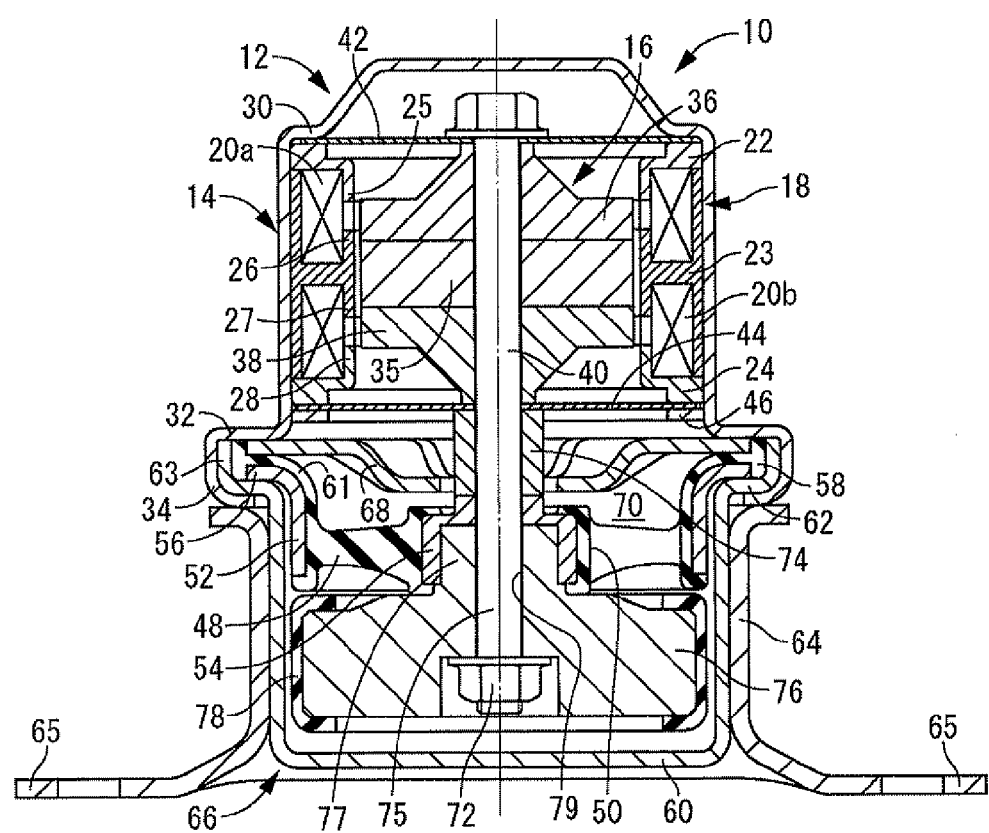
FIG. 2 is a longitudinal cross sectional view of the active vibration damper with an additional mass member attached.

Specifically, in FIG. 2, the lower cover 60 having a large depth dimension is employed. This affords a large distance between opposed faces of the elastic connecting rubber 48 and the floor face of the lower cover 60, thereby ensuring a space for disposing the additional mass member 76 between axially opposed faces of these elastic connecting rubber 48 and lower cover 60.

In addition, by employing the output shaft 40 having a large length dimension, the mass body holding portion 75 for holding the additional mass member 76 largely juts out within the space for disposing the additional mass member 76. Consequently, the additional mass member 76 of sufficient size can be attached to the mass body holding portion 75.

Figure 3:
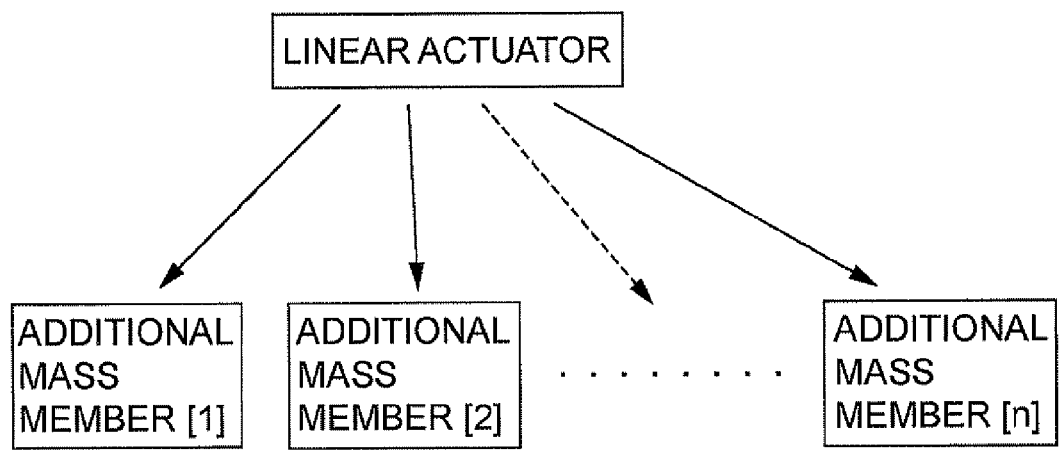
FIG. 3 is a configuration diagram showing the active vibration damper and the additional mass members assorted therefor.

In FIG. 3, the multiple types of the additional mass members 76 differing in mass from one another (additional mass member [1], additional mass member [2], . . . , additional mass member [n] in FIG. 3) are assorted for the one linear actuator 12, and the linear actuator 12 and the additional mass members 76 are assembled. The additional mass member 76 is of generally round block shape and has a mass depending on the desired vibration damping characteristics of the active vibration damper 10. The additional mass member 76 includes an integrally formed mating portion 77 that projects upwardly from its diametrical center section, and an insertion hole 79 that penetrates through the center of the mating portion 77 in the axial direction. The outside peripheral face of the additional mass member 76 is covered by a covering rubber layer 78, thereby providing a stopper mechanism for limiting in cushioned fashion the amount of displacement of the additional mass member 76 when the additional mass member 76 comes into contact against the lower cover 60 and the outside peripheral fastener fitting 52.

The covering rubber layer 78 need not be bonded by vulcanization to the additional mass member 76. It would be also acceptable that, as illustrated, the covering rubber layer 78 includes annular detent pieces integrally formed with the axially opposite end openings thereof and projecting diametrically inward so as to be detained with respect to the axially opposed end faces of the additional mass member 76. In this way, the separate covering rubber layer 78 is mounted on and covers the additional mass member 76 without being bonded thereto.

The additional mass member 76 is superposed against the inside peripheral fastener fitting 54 from below while the mating portion 77 of the additional mass member 76 is fitted into the inside peripheral fastener fitting 54. Then, output shaft 40 is inserted into the insertion hole 79 of the additional mass member 76 and the nut 72 is screwed onto the distal end of the output shaft 40, whereby the additional mass member 76 is secured to the movable member 16 side. By so doing, the additional mass member 76 constitutes the mass member of the dynamic shock absorber together with the output shaft 40, magnet 35, and first, second magnetic pole forming members 36, 38, so that the additional mass member 76 is adapted to be oscillated up and down in the axial direction in association with oscillating displacement of the movable member 16. The additional mass member 76 includes a circular recess opening downwardly in the diametrical center section thereof, which functions as a housing space for the nut 72.

That is, it is possible for the active vibration damper 10 according to the present embodiment to select whether or not to attach the additional mass member 76, and which one or more of the additional mass members 76 to be attached based on the required mass during production. There will be described one example of a method of manufacturing the active vibration damper 10 as described above.

Initially, the stator 14 incorporating the coil member 18 is secured to the upper cover 30 while the movable member 16 incorporating the output shaft 40 is elastically connected to the stator 14 by the first and second leaf springs 42, 44, thereby forming the linear actuator 12 operatable by itself through energization from the outside. This completes the step of preparing the linear actuator 12.

In preferred practice, the operation inspection step is provided for inspecting operation characteristics of the prepared linear actuator 12 by itself. This will early discover operation failure of the linear actuator 12 due to disconnection or the like, and avoid occurrence of defective products or variability in product ability.

Then, the outside peripheral fastener fitting 52 and the inside peripheral fastener fitting 54 are set in the mold for vulcanization molding and the cavity of the mold for molding is filled with a rubber material. Accordingly, the integrally vulcanization molded component of the elastic connecting rubber 48 that is integrally equipped with these fastener fittings 52, 54 is formed. This completes the step of preparing the elastic connecting rubber 48.

Subsequently, the multiple types of the additional mass members 76 differing in mass from one another (additional mass member [1], additional mass member [2], . . . , additional mass member [n]) are prepared. This completes the step of preparing the additional mass body.

Then, the lower cover 60 is prepared so as to form the housing 66. The multiple types of the lower covers 60 may be prepared according to the respective shapes of the multiple types of the additional mass members 76 so that the appropriate lower cover 60 will be selected from these multiple types of the lower covers 60 in the forming step of the housing 66 described later. The upper cover 30 is also prepared so as to form the housing 66 and partially defines the linear actuator 12. This completes the step of preparing the housing 66.

Next, the stopper fitting 68 is fitted externally around the output shaft 40 of the linear actuator 12 so as to be superposed against the outside peripheral fastener fitting 52 while the output shaft 40 is inserted into the spacer member 74 and the inside peripheral fastener fitting 54. By so doing, the elastic connecting rubber 48 is attached to the output shaft 40, thereby completing the step of attaching the elastic connecting rubber 48. After insertion of the output shaft 40 into the inside peripheral fastener fitting 54, the output shaft 40 may be temporarily fastened by the nut 72 with a weak tightening force, or alternatively, the output shaft 40 may be secured press-fit into the inside peripheral fastener fitting 54.

Subsequently, whether or not to attach the additional mass member 76 to the lower end portion of the output shaft 40 is decided. Moreover, in case of attaching the additional mass member 76, which one or more additional mass members 76 to be attached from the multiple types of the additional mass members 76 differing in mass from one another is decided based on the required mass. By attaching the selected additional mass member 76 to the mass body holding portion 75, which is the lower end portion of the output shaft 40, and fastening it with the nut 72, the tuning of vibration damping characteristics is set depending on the mass of the additional mass member 76. This completes the step of attaching the additional mass body.

The lower cover 60 is then selected in accordance with the shape and size of the additional mass member 76 and the selected lower cover 60 is put on the elastic connecting rubber 48 from below. The opening of the upper cover 30 and the opening of the lower cover 60 are detained by caulking against each other, thereby forming the housing 66. At this point, the sealing rubber 58 is clasped between the respective openings of the upper and lower covers 30, 60 so as to seal the linking portion of the upper and lower covers 30, 60. With this arrangement, the space separated by the housing 66 is sealed off from the external space while defining the hermetic accommodation area 70 that accommodates the first, second leaf springs 42, 44 and the elastic connecting rubber 48. This completes the step of forming the housing, so that the active vibration damper 10 is acquired. Besides, the bracket 64 prepared in advance is fastened externally onto the lower cover 60.

In the active vibration damper 10 as described above, it is possible to desirably select whether or not to attach the additional mass member 76, and further select the size, shape or the like of the additional mass member 76 through slight modification of the components. Thus, the multiple types of active vibration dampers having different vibration damping characteristics can be manufactured and provided while imparting uniform configurations to many components. It would also be possible that the length dimension of the output shaft 40 and the depth dimension of the lower cover 60 are made large so as to ensure a space for disposing the additional mass member 76 regardless of whether or not to attach the additional mass member 76. In such case, modification of the output shaft 40 and the lower cover 60 depending on the additional mass member 76 is not necessary.

Furthermore, the elastic connecting rubber 48 is supported at the linking portion of the upper cover 30 and the lower cover 60, whereby this linking portion of the covers 30, 60 is sealed by the sealing rubber 58. By so doing, the hermetic accommodation area 70 that accommodates the stator 14 and the movable member 16 of the linear actuator 12, the elastic connecting rubber 48, as well as the additional mass member 76 is sealed off from the external space. Accordingly, it is possible to avoid operation failure or deterioration of durability due to entry of debris, such as water and grit. Moreover, since the sealing rubber 58 is integrally formed with the elastic connecting rubber 48, an increased number of components can also be avoided.

Figure 4:
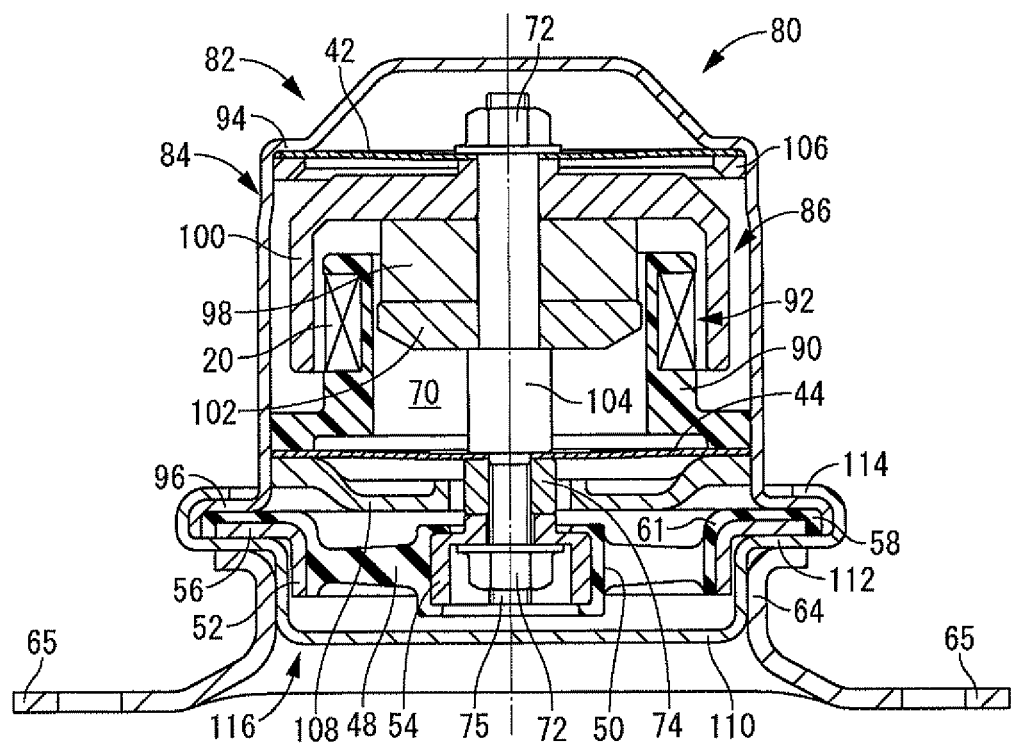
FIG. 4 is a longitudinal cross sectional view of an active vibration damper according to a second embodiment of the present invention, with no additional mass member attached.

Referring next to FIG. 4, there is shown an active vibration damper 80 according to a second embodiment of the present invention. The active vibration damper 80 includes an electromagnetic linear actuator 82. In the following description, components and parts that are substantially identical with those in the preceding first embodiment will be assigned like symbols and not described in any detail.

Described more specifically, the linear actuator 82 has a stator 84 and a movable member 86. The stator 84 includes a coil member 92 serving as an outer tube member defined by the coil 20 wound around a bobbin 90. The bobbin 90 is a member formed of nonmagnetic material (rigid synthetic resin or the like) and has a generally round tubular shape. A flange-shaped support portion is integrally formed with the lower end portion of the bobbin 90. The bobbin 90 is fitted into an upper cover 94. The upper cover 94 has an inverted round tubular shape with a bottom similar to the upper cover 30 according to the preceding first embodiment. The upper cover 94 includes a stepped portion 96 at the opening thereof so that the diameter of the upper cover 94 is made larger on the lower side of the stepped portion 96 rather than on the upper side. The bobbin 90 is supported by the upper cover 94, thereby securing the stator 84 to the upper cover 94. The coil 20 is disposed so as to be spaced apart peripherally inward from the upper cover 94 with a prescribed distance.

On the other hand, the movable member 86 has a construction in which an upper yoke fitting 100 and a lower yoke fitting 102 that forms a magnetic path are attached to the magnet 98. The magnet 98 is of generally annular shape and is magnetized so that magnetic poles are formed on the axially opposite end portions of the magnet 98. The upper yoke fitting 100 is a member formed of a ferromagnetic material such as iron and has an inverted, generally round tubular shape with a bottom. An insertion hole that penetrates through the bottom wall of the upper yoke fitting 100 is formed at its diametrical center section. The lower yoke fitting 102 is formed of a ferromagnetic material similar to the upper yoke fitting 100 and has a generally round disk plate shape. The outside peripheral portion of the lower yoke fitting 102 becomes progressively thinner towards its outer peripheral side. The upper base wall part of the upper yoke fitting 100 is superposed against the upper face of the magnet 98 while the lower yoke fitting 102 is superposed against the lower face of the magnet 98. With this arrangement, the lower end portion of the peripheral wall of the upper yoke fitting 100 is disposed so as to be spaced apart to the outer peripheral side of the lower yoke fitting 102 with a prescribed distance therebetween, thereby forming a diametrical magnetic field diametrically between the upper yoke fitting 100 and the lower yoke fitting 102.

An output shaft 104 that constitutes an inner shaft member is inserted through the diametrical center portions of the magnet 98 and the yoke fittings 100, 102. The output shaft 104 is of generally rod shape and has screw threads at its opposite end portions. The axial medial portion of the output shaft 104 is provided with opposing flats, around which the magnet 98 and the yoke fittings 100, 102 are fitted externally. Accordingly, the axial mounting locations of the magnet 98 and the yoke fittings 100, 102 with respect to the output shaft 104 are regulated while circumferential rotation of these components are prevented. After fitting of the magnet 98 and the yoke fittings 100, 102 externally around the output shaft 104, the nut 72 is screw-fastened onto the upper end portion of the output shaft 104, whereby the magnet 98 and the yoke fittings 100, 102 are fastened to one another.

The axially opposite sides of the output shaft 104 are elastically connected to the upper cover 94 by the first, second leaf springs 42, 44. With this arrangement, the movable member 86 including the output shaft 104 is elastically connected to the upper cover 94 and hence to the stator 84 in a mode such that tiny displacement in the axial direction is allowed. The coil 20 of the stator 84 is inserted diametrically between the upper yoke fitting 100 and the lower yoke fitting 102 of the movable member 86 and disposed so as to be spaced apart therefrom with a prescribed distance. In the present embodiment, the center section of the first leaf spring 42 is secured to the output shaft 104 with the nut 72 while the outer peripheral edge of the first leaf spring 42 is clasped between the upper base wall part of the upper cover 94 and an annular fastening ring 106 fitted into the upper cover 94. On the other hand, the center section of the second leaf spring 44 is fitted externally onto the output shaft 104 and supported by the spacer member 74 utilizing tightening force of the nut 72, while the outer peripheral edge of the second leaf spring 44 is clasped between the bobbin 90 and a stopper fitting 108 of round disk plate shape secured press-fit into the upper cover 94.

In this way, the linear actuator 82 operatable by itself through energization from the outside is realized. In the linear actuator 82, when the coil 20 is energized by the external power supply, current flows through the magnetic field formed by the magnet 98 and the yoke fittings 100, 102, and oscillation force will generate so as to oscillate the movable member 86 in the axial direction with respect to the stator 84.

The lower end portion of the output shaft 104 is inserted into the inside peripheral fastener fitting 54 that is affixed to the diametrical center of the elastic connecting rubber 48, and fastened by the nut 72. The outside peripheral fastener fitting 52 affixed to the outer peripheral edge of the elastic connecting rubber 48 is supported by a lower cover 110. The lower cover 110 has a generally round tubular shape with a bottom similar to the lower cover 60 according to the preceding first embodiment and its opening includes a stepped portion 112 and a caulking piece 114 integrally formed to the upper side of the stepped portion 112. The flange portion 56 of the outside peripheral fastener fitting 52 is superposed against the stepped portion 112 of the lower cover 110 while the opening of the upper cover 94 and the opening of the lower cover 110 are joined to each other by the caulking piece 114, thereby forming a housing 116. In this respect, the sealing rubber 58 is clasped between the stepped portion 96 of the upper cover 94 and the stepped portion 112 of the lower cover 110. The linking portion of the upper cover 94 and the lower cover 110 is sealed so that the hermetic accommodation area 70 sealed off from the external space is formed.

Figure 5:
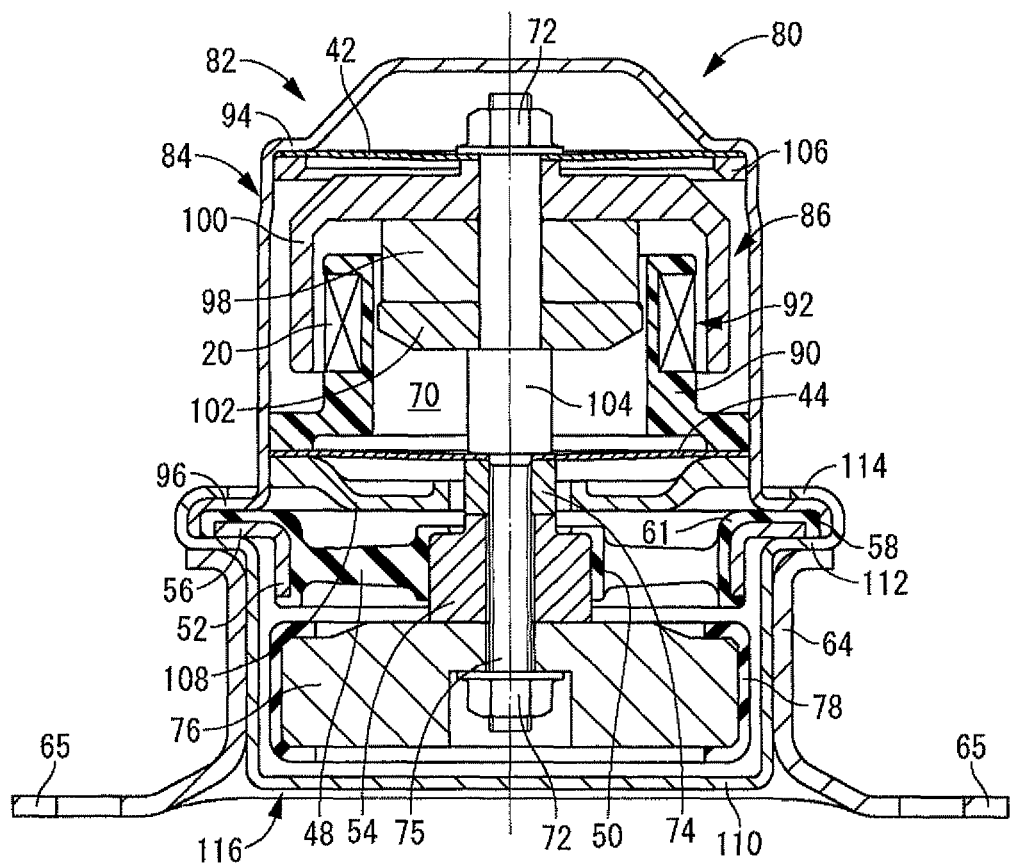
FIG. 5 is a longitudinal cross sectional view of the active vibration damper with an additional mass member attached.

The active vibration damper 80 of this construction is also capable of holding the additional mass member 76, similar to the active vibration damper 10. Specifically, as depicted in FIG. 5, the lower end portion of the output shaft 104 that projects below the inside peripheral fastener fitting 54 is inserted through the insertion hole of the additional mass member 76, and the nut 72 is screwed onto the output shaft 140. With this arrangement, the additional mass member 76 is adapted to be mounted to the opposite side of the linear actuator 82 with the elastic connecting rubber 48 being interposed therebetween. Therefore, the active vibration damper 80 allows retuning of the vibration damping characteristics by selecting the additional mass member 76 without the need for modifying many of the components.

Figure 6:
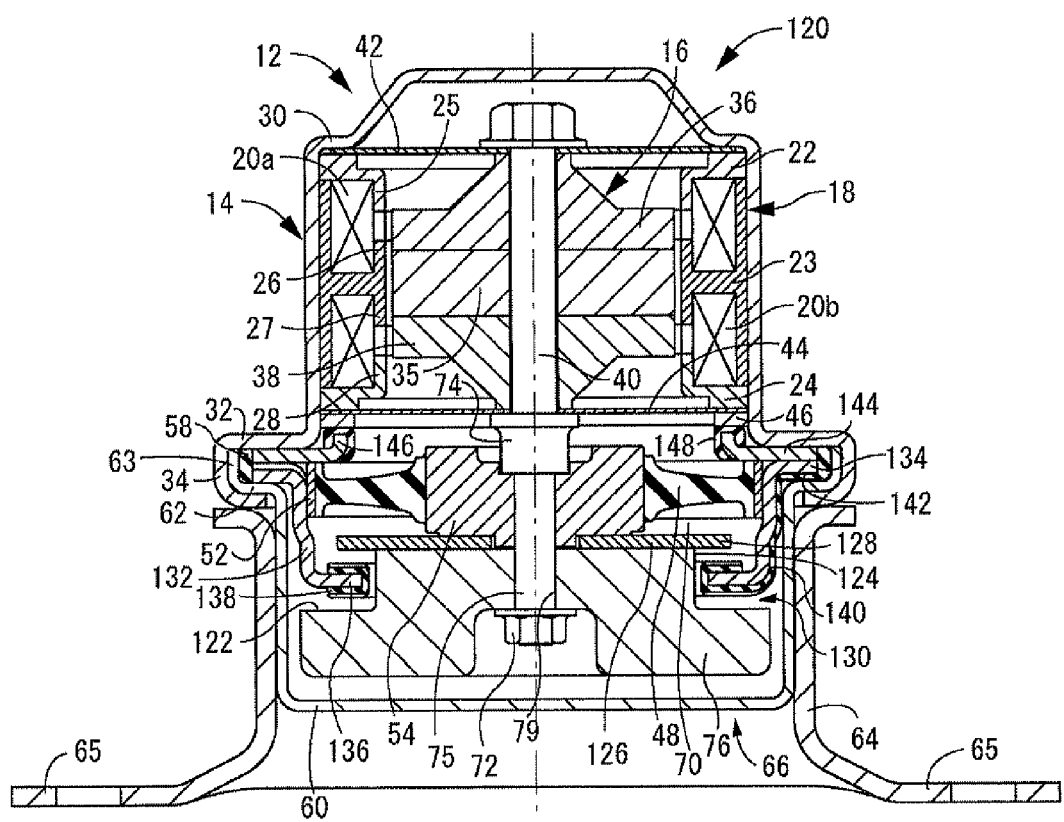
FIG. 6 is a longitudinal cross sectional view of an active vibration damper according to a third embodiment of the present invention, with an additional mass member attached.

Furthermore, referring to FIG. 6, there is depicted an active vibration damper 120 according to a third embodiment of the present invention. As compared with FIG. 2 showing the active vibration damper 10 according to the preceding first embodiment, it will be apparent that the active vibration damper 120 of the present embodiment is equipped with the same linear actuator 12 as in the first embodiment. Below the linear actuator 12, there are disposed the elastic connecting rubber 48 and the additional mass member 76, similar to the first embodiment. These elastic connecting rubber 48 and additional mass member 76 are housed within the hermetic accommodation area 70 formed by the upper cover 30 and the lower cover 60. As an aid to understanding of FIG. 6, components that are equal in construction to components employed in the first embodiment have been assigned the same drawing symbols as in the first embodiment.

Here, in the present embodiment, there is employed different constructions from those employed in the first embodiment, with respect to the stopper mechanism for limiting in cushioned fashion the amount of displacement of the additional mass member 76 as well as the sealing rubber construction at the linking portion of the upper cover 30 and the lower cover 60 that provide the housing 66.

Specifically, with regard to the outside peripheral face of the additional mass member 76, a stepped portion 122 is provided to the axially medial section, and the axially upper portion of the stepped portion 122 is defined by a small-diameter outside peripheral face 124. Moreover, an upper abutting fitting 126 of round disk plate shape is superposed against the upper end face of the additional mass member 76. The upper abutting fitting 126 is attached with its inside peripheral portion held clasped between the additional mass member 76 and the inside peripheral fastener fitting 54. The outside peripheral portion 128 of the upper abutting fitting 126 projects further outwardly than the small-diameter outside peripheral face 124 of the additional mass member 76. Accordingly, the stepped portion 122 of the additional mass member 76 and the outside peripheral portion 128 of the upper abutting fitting 126 are axially opposed to each other with the small-diameter outside peripheral face 124 of the additional mass member 76 being interposed therebetween. With this arrangement, there is formed an annular recess 130 that opens onto the outside peripheral face of the additional mass member 76 and extends about the entire circumference in the circumferential direction.

Meanwhile, to the outer peripheral side of the additional mass member 76 there is disposed a stopper fitting 132 serving as an acting member. The stopper fitting 132 has a generally circular cylinder shape. A holding part 134 is integrally formed with the axially upper end portion of the stopper fitting 132 and flares peripherally outward. On the other hand, an abutting portion 136 is integrally formed with the lower end portion of the stopper fitting 132 and extends peripherally inward.

The holding part 134 is superposed against the stepped portion 62 of the lower cover 60 that constitutes the housing 66 and detained by caulking with the caulking piece 34 of the upper cover 30. In this detained state, the abutting portion 136 of the stopper fitting 132 is inserted within the recess 130 of the additional mass member 76 from its outer peripheral side opening.

The sealing rubber 58 is formed so as to cover the outside peripheral face of the holding part 134 and projects axially upward from the holding part 134 so as to have a tubular shape. Similar to the first embodiment, the caulked portion of the upper and lower covers 30, 60 that constitutes the housing 66 is sealed by the sealing rubber 58.

Moreover, a cushion rubber 138 serving as an acting rubber is formed so as to cover the abutting portion 136 entirely. The abutting portion 136 is opposed to the inside face of the recess 130 in the axial and axis-perpendicular direction with a prescribed gap formed between the outside face of the cushion rubber 138 and the inside face of the recess 130 of the additional mass member 76. With this arrangement, when the additional mass member 76 undergoes large displacement relative to the housing 66, the stator 14 secured thereto, or the like, the abutting portion 136 of the stopper fitting 132 will strike the inside face of the recess 130 of the additional mass member 76 via the cushion rubber 138, thereby providing a stopper mechanism for limiting in cushioned fashion the amount of displacement of the additional mass member 76.

Meanwhile, the above-described sealing rubber 58 and the cushion rubber 138 are connected by and integrally formed with a connecting rubber 140 that is formed so as to cover the outside peripheral face of the stopper fitting 132. In particular, the holding part 134 provided to the outer peripheral edge of the stopper fitting 132 includes recessed grooves 142 formed at multiple locations along the circumference so as to open downward and extend in the diametrical direction. The connecting rubber 140 is formed so as to fill up and cover the recessed grooves 142. Specifically, the connecting rubber 140 is formed partially on the circumference of the stopper fitting 132, so that at the portions where the connecting rubber 140 is not formed, the fastening force by the caulking piece 34 is exerted on the holding part 134 without interposing the connecting rubber 140, whereby a firm fastening force by metal-to-metal contact will stably exhibit for a long period of time. In the present embodiment, the holding part 134 is corrugated, being wavy in the vertical direction around the circumference. The recessed grooves 142 opening downward are formed at the upwardly convex portions while the downwardly convex portions are superposed against the stepped portion 62 of the lower cover 60 in metal-to-metal contact.

Besides, in the present embodiment, the outside peripheral fastener fitting 52 that is bonded by vulcanization to the outside peripheral face of the elastic connecting rubber 48 has a straight, round tubular shape. By being secured press-fit into the axially upper opening of the stopper fitting 132, the outside peripheral fastener fitting 52 is secured to the housing 66 via the stopper fitting 132.

Furthermore, a support fitting 144 is disposed on top of the holding part 134 of the stopper fitting 132. The support fitting 144 has a ring plate shape and its inner peripheral edge includes an annular projecting portion 146 that rises slightly upward. A presser rubber 148 is formed so as to cover the outside face of the annular projecting portion 146.

The outside peripheral portion of the support fitting 144 is superposed directly against the top of the holding part 134 of the stopper fitting 132, and is clasped together with the holding part 134 between opposed faces of the stepped portion 62 of the lower cover 60 and the stepped portion 32 of the upper cover 30 that constitute the housing 66 so as to be detained by the caulking piece 34 of the upper cover 30.

The caulked portion of the support fitting 144 is in metal-to-metal contact with the stepped portion 32 of the upper cover 30 about the entire circumference while being in metal-to-metal contact with the holding part 134 of the stopper fitting 132 at the multiple locations that is upwardly convex along the circumference. At the outer peripheral side of the stopper fitting 132 and the support fitting 144, the sealing rubber 58 is clamped between the respective stepped portions 32, 62 of the upper and lower covers 30, 60 so that the caulked portion is sealed.

The inside peripheral portion of the support fitting 144 caulked in this way protrudes peripherally inward from the holding part 134 of the stopper fitting 132 and presses the upper end face of the outside peripheral fastener fitting 52 that is secured press-fit into the stopper fitting 132, thereby preventing the outside peripheral fastener fitting 52 from becoming dislodged upward. Moreover, the annular projecting portion 146 of the support fitting 144 faces the lower opening of the upper cover 30 and is slightly inserted thereto. The upper end face of the annular projecting portion 146 is superposed and pressed from axially below against the fastening ring 46 of the linear actuator 12 via the presser rubber 148.

With this arrangement, support fitting 144 exerts resistance force on the coil member 18 that constitutes the stator 14 so as not to slip out axially downward from the upper cover 30. In addition, owing to interposition of the presser rubber 148 in the pressing portion of the support fitting 144 against the fastening ring 46, even in the case where the axial position of the fastening ring 46 varies due to tolerances of each component of the coil member 18, the upper cover 30, or the like, the variation is adapted to be absorbed by the elastic deformation of the presser rubber 148 so that desired pressing force will be stably exhibited.

Therefore, in the active vibration damper 120 constructed as above, in addition to exhibition of the effect similar to those of the preceding first and second embodiments, by providing the cushion rubber 138 covering the stopper fitting 132 so as to constitute the stopper mechanism for limiting the amount of displacement of the additional mass member 76, it is not necessary to mount the large covering rubber layer (78) onto the additional mass member 76, thereby acquiring easier fabrication. In particular, since the stopper fitting 132 has a smaller size and lower heat capacity than the additional mass member 76, it is possible to do with a mold of smaller size and achieve shorter vulcanizing time as compared with the case where the covering rubber layer (78) is bonded by vulcanization to the additional mass member 76.

Furthermore, by employing the stopper fitting 132 furnished with the abutting portion 136 that is inserted into the recess 130 opening onto the outside peripheral face of the additional mass member 76, the stopper mechanism for limiting the amount of displacement of the additional mass member 76 to both sides in the axial direction can be realized with compact size and a simple structure.

Moreover, the sealing rubber 58 that seals the caulked portion of the housing 66 is integrally formed with the cushion rubber 138 and is integrally vulcanization molded to the stopper fitting 132. Accordingly, it is possible to select materials that will reliably satisfy the requirements of both rubbers such as durability or load bearing capability, thereby improving characteristics of the sealing rubber 58 and the cushion rubber 138.

Figure 7:
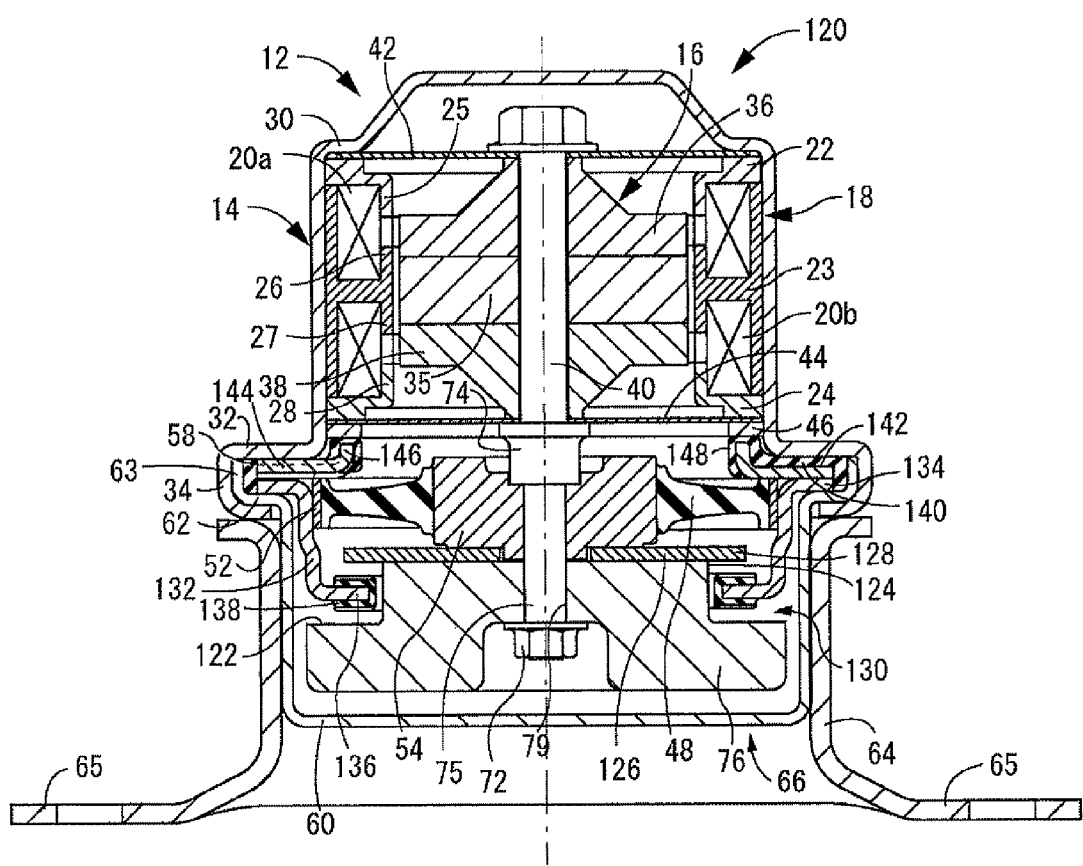
FIG. 7 is a longitudinal cross sectional view of an active vibration damper according to another embodiment of the present invention, with an additional mass member attached.

Whereas in the above-described third embodiment, the sealing rubber 58 covers the stopper fitting 132 so as to be integrally formed with the cushion rubber 138, it is also acceptable that, as depicted in FIG. 7 for example, the sealing rubber 58 covers the support fitting 144 so as to be integrally formed with the presser rubber 148.

In this case, as depicted in FIG. 7, it is desirable that the holding part 134 of the stopper fitting 132 has a flat ring plate shape while the support fitting 144 has a corrugated shape around the circumference, and includes at least one recessed groove 142 that opens onto the upper face of the support fitting 144 at an appropriate location along the circumference and extends in the diametrical direction. The connecting rubber 140 is formed so as to cover the recessed groove 142, thereby connecting and integrally forming the sealing rubber 58 and the presser rubber 148.

With this arrangement, in the caulked portion of the housing 66, it is possible to superpose the support fitting 144 against both of the stepped portion 32 of the upper cover 30 and the holding part 134 of the stopper fitting 132 in metal-to-metal contact, and firmly detain each component in metal-to-metal contact by caulking between the respective stepped portions 32, 62 of the upper and lower covers 30, 60.

That is, in the mode depicted in FIG. 7, the stator 14 is positioned in abutment against the fastening ring 46 so as to generate a force to move downward relative to the upper cover 30 (dislodging force). This force is received as an acting force by the support fitting 144 and exerted on the housing 66, so that the support fitting 144 serves as an acting member. The sealing rubber 58 serving as an annular seal is integrally formed with the presser rubber 148 serving as an acting rubber that is formed so as to cover the annular projecting portion 146, which is an input portion of the acting force of the acting member.

While the present invention has been described hereinabove in terms of certain preferred embodiments, these are merely exemplary, and the invention shall not be construed as limited in any way to the specific disclosures in the embodiments.

For example, the inner shaft member and the outer tube member are not necessarily limited to components that extend continuously in the axial direction across the entire length, but may be defined by a plurality of components divided in the axial direction. As a specific example, a construction in which the upper projecting portion of the inner shaft member has a shape of projection integrally formed with the first magnetic pole forming member while the lower projecting portion of the inner shaft member has a shape of projection integrally formed with the second magnetic pole forming member could be employed.

Also, it will suffice for the housing to be dividable in the axial direction, and no particular limitation is imposed as to means for connecting the upper cover and the lower cover that constitute the housing. As a specific example, it would also be acceptable that the upper cover and the lower cover include a fixed flange at their respective openings, and the fixed flanges are connected by bolts so as to form the housing.

Moreover, in one preferred arrangement, within the hermetic accommodation area separated from the external space by the housing, a volume at either side across the movable member is equal to each other. Specifically, in the active vibration damper 10 according to the preceding first embodiment, the hermetic accommodation area 70 may be viewed as a structure in which the first and second air chambers are formed at either side across the magnet 35 and the first, second magnetic pole forming members 36, 38, and these first and second air chambers are interconnected by a constricted zone formed between the coil member 18 on the one hand, and the magnet 35 and first, second magnetic pole forming members 36, 38 on the other. When high-frequency oscillation force is exerted, the constricted zone assumes a substantially obstructed state so that the first and second air chambers will substantially be hermetic. As a result, the movable member 16 will be subjected to an axial force due to air spring in the first and second air chambers. In this respect, on condition that a volume of the air filled within the first air chamber and a volume of the air filled within the second air chamber are equal to each other, a force that is exerted on the movable member 16 by the air spring of the first air chamber and a force that is exerted on the movable member 16 by the air spring of the second air chamber will be equal to each other. Therefore, the movable member 16 is prevented from dislocation in the axial direction with respect to the intended location due to the air spring during oscillating displacement, thereby stably ensuring desired vibration damping characteristics. Additionally, it is possible to avoid deterioration of accuracy in excitation control of the movable member 16 due to unbalanced action of the air spring.

Furthermore, in the embodiments shown in FIGS. 6 and 7, the recess 130 that opens onto the outside peripheral face of the additional mass member 76 may alternatively be formed partially on the circumference. For example, in the case where the recess 130 that extends partially along the circumference is employed, the recess 130 and the abutting portion 136 of the stopper fitting 132 inserted into the recess 130 will come into abutment at their respective circumferential end faces. This arrangement makes it possible to provide a stopper function for limiting in cushioned fashion an amount of displacement of the additional mass member 76 in the circumferential direction about the center axis.

Still further, the active vibration damper according to the present invention is not necessarily limited to be employed for use in automotive applications, but would also be employed for use, for example, in train cars, motorized two wheeled vehicles, or the like. Besides, even where the present invention is employed for use in automotive applications, the target member whose vibration is to be damped is not limited to a suspension member.

KEY TO SYMBOLS 10, 80, 120: active vibration damper, 12, 82: linear actuator, 14, 84: stator, 16, 86: movable member, 18, 92: coil member, 30, 94: upper cover, 34: caulking piece, 40, 104: output shaft, 42: first leaf spring, 44: second leaf spring, 48: elastic connecting rubber, 52: outside peripheral fastener fitting, 54: inside peripheral fastener fitting, 58: sealing rubber, 60, 110: lower cover, 61, 140: connecting rubber, 66, 116: housing, 70: hermetic accommodation area, 75: mass body holding portion, 76: additional mass member, 78: covering rubber layer, 130: recess, 132: stopper fitting, 136: abutting portion, 138: cushion rubber, 142: recessed groove, 144: support fitting, 148: presser rubber

The invention claimed is:

1. An active vibration damper comprising:
an electromagnetic linear actuator incorporating a stator and a movable member exerting oscillation force on each other, the stator being attached to a target member whose vibration is to be damped while the movable member is elastically supported by the target member via an elastic connecting rubber;
an inner shaft member fixed to the movable member so as to project to both sides in a direction in which the oscillation force exerts;
an outer tube member comprising a coil and being fixed to the stator so as to be spaced apart peripherally outward from the inner shaft member and so as to extend to both sides in an axial direction;
a pair of leaf springs elastically connecting projecting portions situated on axially both sides of the inner shaft member and the outer tube member;
the elastic connecting rubber being disposed outwardly from one axial side of the linear actuator and connecting the inner shaft member and the outer tube member, an outer peripheral edge of the elastic connecting rubber being bonded by vulcanization to an outside peripheral fastener fitting of large-diameter tubular shape and an inner peripheral edge of the elastic connecting rubber being bonded by vulcanization to an inside peripheral fastener fitting of smaller-diameter tubular shape;
a mass body holding portion formed by an end portion of the inner shaft member, the inner shaft member extending though the inside peripheral fastener fitting to an opposite side of the linear actuator with the inside peripheral fastener fitting being interposed between the end portion and the opposite side, and formed by a fastening member detachably fixed to the end portion of the inner shaft member, the mass body holding portion being capable of holding at least one additional mass body corresponding to a frequency of the vibration of the target member, the at least one additional mass body being disposed further outwardly than the elastic connecting rubber from the one axial side of the linear actuator; and
a housing fixed to the stator of the linear actuator and separating a relative displacement zone of the stator and the movable member from an external space while accommodating the pair of leaf springs and the elastic connecting rubber, the housing having a structure dividable in the axial direction in which respective openings are secured to each other with an annular seal being interposed therebetween at an outer peripheral side of the elastic connecting rubber,
wherein the at least one additional mass body is selected from a plurality of mass bodies having differing masses assorted for the linear, the plurality of mass bodies being attachable to the mass body holding portion while being forcedly held between the inside peripheral fastener fitting and the fastening member.

2. The active vibration damper according to claim 1, wherein:
the housing having the structure dividable in the axial direction is such that the respective openings at a dividable portion are detained by caulking against each other;
an acting member is supported by a caulked portion of the respective openings so as to extend into the housing and exert an acting force on the housing;
an acting rubber is affixed to an input portion, the input portion being the location where the acting force exerted by the acting member is input; and
the annular seal is integrally formed with the acting rubber and affixed to the acting member.

3. The active vibration damper according to claim 2, wherein the acting rubber comprises the elastic connecting rubber, and the annular seal is integrally formed with the elastic connecting rubber.

4. The active vibration damper according to claim 2, wherein the at least one additional mass body includes a recess formed on an outside peripheral face thereof, and
a distal end on an inner peripheral side of the acting member is inserted into the recess while a cushion rubber serving as the acting rubber is affixed to the distal end on the inner peripheral side of the acting member so that a stopper mechanism is formed for exerting the acting force by the acting member coming into abutment against an inside face of the recess on the housing via the cushion rubber and for limiting in cushioned fashion an amount of displacement of the additional mass body with respect to the outer tube member in the axial direction of the inner shaft member.

5. The active vibration damper according to claim 2, wherein an outer peripheral edge of the acting member supported by the caulked portion of the housing is provided with a recessed groove extending in an axis-perpendicular direction, and a connecting rubber extending within the recessed groove connects the acting rubber and the annular seal partially along a circumference so that the acting member is detained by caulking in metal-to-metal contact at a circumferential location situated away from a formation zone of the recessed groove.

6. The active vibration damper according to claim 1, wherein a volume of an air filled within the relative displacement zone of the stator and the movable member formed by the housing is equal at either side across the movable member in the direction in which the oscillation force exerts.

7. A method of manufacturing an active vibration damper, comprising the following steps of:
preparing a linear actuator, in combination with an elastic connecting rubber, a plurality of additional mass bodies having different masses, and a housing;
attaching the elastic connecting rubber to the linear actuator;
optionally attaching at least one of the plurality of additional mass bodies to the linear actuator, based upon a frequency of vibration of a target member; and
forming the housing, wherein the linear actuator comprises:
a stator and a movable member exerting oscillation force on each other;
an inner shaft member fixed to the movable member so as to project to both sides in a direction in which the oscillation force exerts;
an outer tube member comprising a coil and being fixed to the stator so as to be spaced apart peripherally outward from the inner shaft member and extend to both sides in an axial direction; and a pair of leaf springs elastically connecting projecting portions situated on axially both sides of the inner shaft member and the outer tube member, wherein the elastic connecting rubber is disposed outwardly from one axial side of the linear actuator and connects the inner shaft member and the outer tube member, wherein an outer peripheral edge of the elastic connecting rubber is bonded by vulcanization to an outside peripheral fastener fitting of large-diameter tubular shape and an inner peripheral edge of the elastic connecting rubber is bonded by vulcanization to an inside peripheral fastener fitting of smaller-diameter tubular shape, wherein the at least one additional mass body of the plurality of additional mass bodies is disposed further outward than the elastic connecting rubber from the one axial side of the linear actuator, and is selectively attachable to a mass body holding portion formed by an end portion of the inner shaft member of the linear actuator, the inner shaft member extending through the inside peripheral fastener fitting to an opposite side of the linear actuator with the inside peripheral fastener fitting being interposed between the end portion and the opposite side, and formed by a fastening member detachably fixed to the end portion of the inner shaft member, such that the at least one additional mass body is forcedly held between the inside peripheral fastener fitting and the fastening member, and wherein the housing has a structure dividable in the axial direction in which respective openings are secured to each other with an annular seal being interposed therebetween at an outer peripheral side of the elastic connecting rubber, and is fixed to the stator of the linear actuator so as to separate a relative displacement zone of the stator and the movable member from an external space while accommodating the pair of the leaf springs and the elastic connecting rubber.

8. The method of manufacturing an active vibration damper according claim 7, wherein prior to attachment of the elastic connecting rubber, operation characteristics are inspected with respect to the linear actuator by itself.

* * * * *